United States Patent
Lewis

(10) Patent No.: US 11,461,119 B2
(45) Date of Patent: Oct. 4, 2022

(54) VIRTUAL CONTAINERS CONFIGURED TO SUPPORT MULTIPLE MACHINE LEARNING MODELS

(71) Applicant: Bank of America Corporation, Charlotte, NC (US)

(72) Inventor: Patrick Lewis, Denver, NC (US)

(73) Assignee: Bank of America Corporation, Charlotte, NC (US)

( * ) Notice: Subject to any disclaimer, the term of this patent is extended or adjusted under 35 U.S.C. 154(b) by 159 days.

(21) Appl. No.: 17/021,572

(22) Filed: Sep. 15, 2020

(65) Prior Publication Data

US 2022/0083363 A1    Mar. 17, 2022

(51) Int. Cl.
*G06F 9/455* (2018.01)
*H04L 67/02* (2022.01)
*G06F 9/54* (2006.01)
*G06N 20/00* (2019.01)

(52) U.S. Cl.
CPC .......... *G06F 9/45533* (2013.01); *G06F 9/547* (2013.01); *G06N 20/00* (2019.01); *H04L 67/02* (2013.01)

(58) Field of Classification Search
None
See application file for complete search history.

(56) References Cited

U.S. PATENT DOCUMENTS

| | | | |
|---|---|---|---|
| 7,295,116 B2 | 11/2007 | Kumar et al. | |
| 9,547,835 B2 * | 1/2017 | Basu | G06Q 10/06311 |
| 10,108,902 B1 | 10/2018 | Lockett | |
| 10,394,532 B2 | 8/2019 | Bar-Or et al. | |
| 10,474,438 B2 | 11/2019 | Bijani et al. | |
| 10,565,093 B1 | 2/2020 | Herrin et al. | |
| 11,257,002 B2 * | 2/2022 | Faulhaber, Jr. | G06N 5/04 |
| 11,321,130 B2 * | 5/2022 | Hallur | G06F 21/53 |
| 2018/0113748 A1 * | 4/2018 | Pagade | H04L 67/1095 |
| 2020/0019882 A1 * | 1/2020 | Garg | G06F 21/6218 |
| 2021/0152857 A1 * | 5/2021 | Xiao | H04N 21/4431 |
| 2021/0373965 A1 * | 12/2021 | Hadas | G06F 9/45558 |
| 2022/0083363 A1 * | 3/2022 | Lewis | G06F 9/45533 |
| 2022/0166607 A1 * | 5/2022 | Ratha | H04L 9/0877 |

\* cited by examiner

*Primary Examiner* — Lashonda Jacobs-Burton
(74) *Attorney, Agent, or Firm* — Banner & Witcoff, Ltd.

(57) ABSTRACT

Aspects of the disclosure relate to virtual containers configured to support multiple machine learning models. A computing platform may identify, over a network, a deployment identifier associated with a request to deploy one or more machine learning models. Subsequently, the computing platform may retrieve a pre-configured template for a virtualization container. Then, the computing platform may retrieve, from a file server, the one or more machine learning models. Then, the computing platform may retrieve, from a database, pre-processing scripts and post-processing scripts associated with the one or more machine learning models. Subsequently, the computing platform may modify the pre-configured template based on the one or more machine learning models, pre-processing and post-processing scripts. Then, the computing platform may deploy the modified virtualization container to apply the one or more machine learning models. Then, the computing platform may provide results of the applied one or more machine learning models.

20 Claims, 7 Drawing Sheets

VIRTUAL CONTAINERS CONFIGURED TO SUPPORT MULTIPLE MACHINE LEARNING MODELS

BACKGROUND

Aspects of the disclosure relate to deploying digital data processing systems to deploy machine learning models. In particular, one or more aspects of the disclosure relate to virtual containers configured to support multiple machine learning models.

Enterprise organizations may utilize various machine learning models to analyze data and information related to a business of the enterprise organization, and predict various tasks. Machine learning models are generally deployed and managed via a single application programming interface (API) service that is supported and maintained, even though most of the code base for doing so is the same. Ensuring that the models are available in a timely and efficient manner, and changes, and/or updates are performed seamlessly, may be highly advantageous to providing an efficient and effective platform to users of such models. In many instances, providing centralized and standardized platform for the models, while also optimizing the resource utilization, bandwidth utilization, and efficient operations of the computing infrastructure involved in maintaining, accessing, and/or updating the models, may be of may be of high significance to an enterprise organization.

SUMMARY

Aspects of the disclosure provide effective, efficient, scalable, fast, reliable, and convenient technical solutions that address and overcome the technical problems associated with supporting multiple machine learning models.

In accordance with one or more embodiments, a computing platform having at least one processor, and memory storing computer-readable instructions that, when executed by the at least one processor, cause the computing platform to identify, over a network, a deployment identifier associated with a request to deploy one or more machine learning models, where the deployment identifier is indicative of the one or more machine learning models, and pre-processing scripts and post-processing scripts associated with the one or more machine learning models. Subsequently, the computing platform may retrieve, over the network, a pre-configured template for a virtualization container, wherein the pre-configured template may include one or more of a collection of servers corresponding to a development server (DEV), a user acceptance testing server (UAT), a production server (PROD), and a disaster recovery server (DR). Then, the computing platform may retrieve, over the network and based on the deployment identifier and from a file server, the one or more machine learning models. Then, the computing platform may retrieve, over the network and based on the deployment identifier and from a database, the pre-processing scripts and the post-processing scripts. Subsequently, the computing platform may modify the pre-configured template for the virtualization container based on the one or more retrieved machine learning models, the retrieved pre-processing scripts and the retrieved post-processing scripts. Then, the computing platform may deploy, over the network, the modified virtualization container to apply the one or more machine learning models. Then, the computing platform may provide, over the network, results of the applied one or more machine learning models.

In some embodiments, the computing platform may compare, by a computing device, at least one script hash associated with one or more of the pre-processing scripts and the post-processing scripts. Then, the computing platform may, based upon a determination that the at least one script hash has changed, update the one or more of the pre-processing scripts and post-processing scripts. Then, the computing platform may perform, during run-time, a memory hot swap to enable a smooth update of the one or more of the pre-processing scripts and post-processing scripts.

In some embodiments, the computing platform may compare, by a computing device, at least one model hash associated with the one or more machine learning models. Then, the computing platform may, based upon a determination that the at least one model hash has changed, update the one or more machine learning models. Then, the computing platform may perform, during run-time, a memory hot swap to enable a smooth update of the one or more machine learning models.

In some embodiments, the computing platform may determine that the deployment identifier is not associated with a pre-configured template for a virtualization container. Then, the computing platform may trigger configuring of a virtualization container.

In some embodiments, the computing platform receive the request to deploy via a HTTP interface, and where providing the results may be performed via the HTTP interface. In some embodiments, providing the results may be performed via a streaming architecture.

In some embodiments, the computing platform may retrieve test data via an application programming interface. Then, the computing platform may test at least one of the one or more machine learning models based on the test data.

In some embodiments, the computing platform may, after receiving the request, determine a type of pre-configured template for the virtualization container to be retrieved.

In some embodiments, the computing platform may provide, via a graphical user interface, one or more selectable icons associated with at least one of the: pre-configured template for the virtualization container, the one or more machine learning models, the pre-processing scripts, and the post-processing scripts.

In some embodiments, the computing platform may determine, based on a machine learning model, historical usage of the virtualization containers. Then, the computing platform may predict, based on the machine learning model, a demand for the virtualization containers. Then, the computing platform may automatically configure, based on the predicted demand, one or more virtualization containers prior to receiving requests.

In some embodiments, the historical usage may include at least on one of: CPU usage and memory usage, and the computing platform may compare the historical usage to a usage threshold. Then, the computing platform may predict the demand based on the comparing. In some embodiments, the historical usage may include a temporal pattern of activity.

In some embodiments, the computing platform may scale the virtualization container based on the request.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
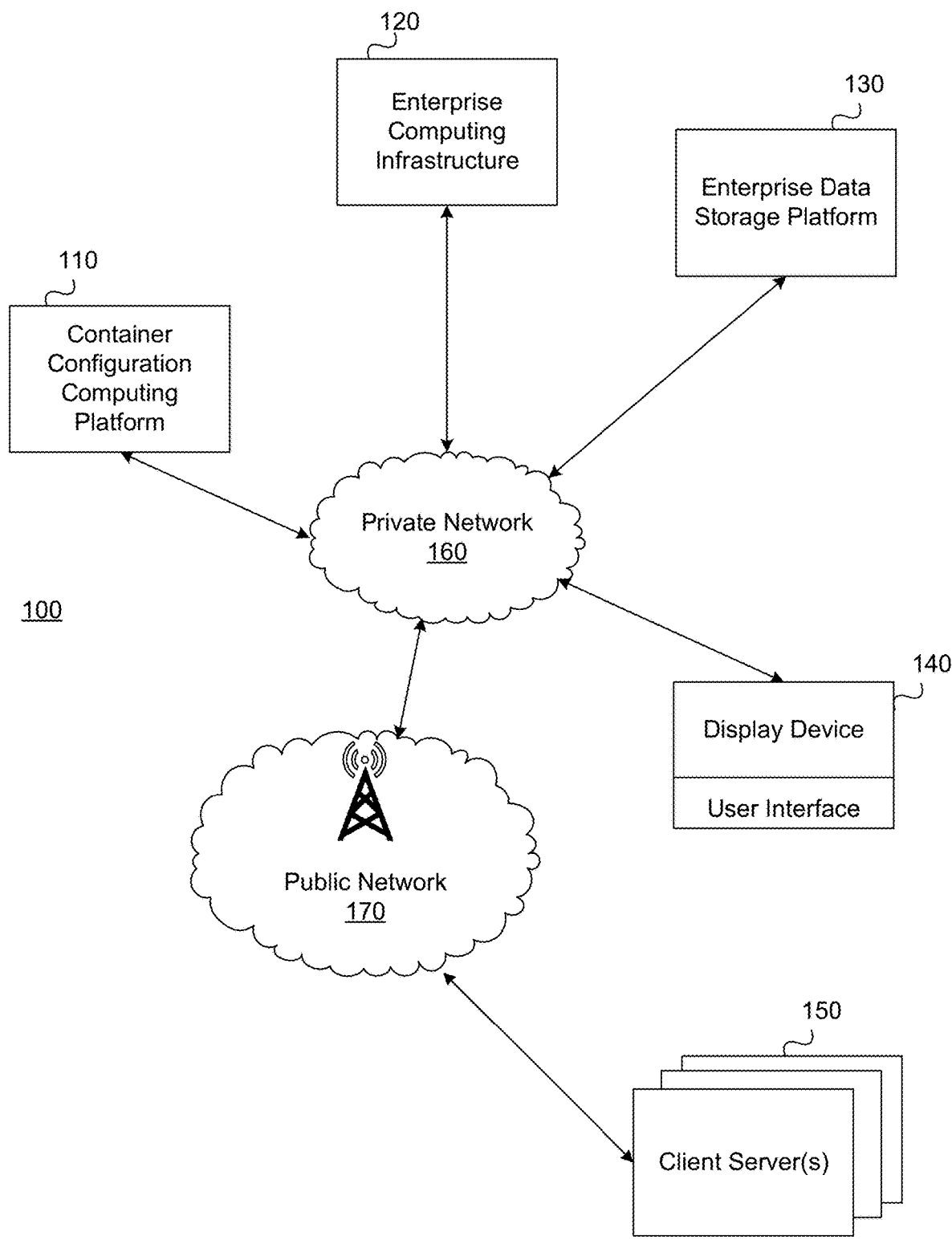
FIGS. 1A and 1B depict an illustrative computing environment for virtual containers configured to support multiple machine learning models.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Machine learning models are generally deployed and managed via separate API services that are supported and maintained even though much of the code base to support the machine learning models is the same. This may cause more technical debt and require multiple application development teams to support each deployment of a model. Available products that host and deploy models through a single service are generally for models that are developed on specific software, and do not allow for the pre and post processing of data to take place.

As described herein, management, deployment, and reloading of models is described, along with code enrichment via a centralized management system. By creating a centralized management system, new models may be deployed with the required enrichment with a click of a button. Since many models may be run within a containerized system, these platforms may be leveraged to auto-scale and route API requests for machine learning models. With an addition of a centralized system managing the enrichment code, changes may be hot-swapped in memory during production with nearly no down time.

In some instances, data scientists may run their models via Flask or some other HTTP framework. However, in such instances, new infrastructure and code is produced for each model. Accordingly, 20 models would now have 20 different DEV, UAT, PROD and DR servers for each model reaching 80 Servers. Also on the risk side, if there was ever a need to update the HTTP code for any reason, all 20 different code bases would need to be updated, producing a lot of technical debt and overhead.

Some aspects of the disclosure relate to reducing the server resources down to only what is needed during peak time by utilizing containerization and automatic deployments and scaling via the Machine Learning as a Service (MLaaS) Platform. Accordingly, there is need for a single DEV, UAT, PROD and DR servers, and this set of servers serve as a single code base which is the core for all of the endpoints and may be updated in a single area. Any custom code for pre and/or post processing may be updated via a user interface of the MLaaS, and may be hot-swapped during runtime to considerable reduce and/or eliminate downtime. A model file serving service may provide the built binary model files over to the prediction services when they are online and/or when they have been updated, thereby reducing downtime and overhead by centralizing the model storage.

As described herein, a rapid creation and deployment of models is provided. A single core code base is generated to reduce technical debt and infrastructure costs. Models may be auto-scaled and load balanced while in use, and a standardized framework is provided for model implementations.

Figure 1B:
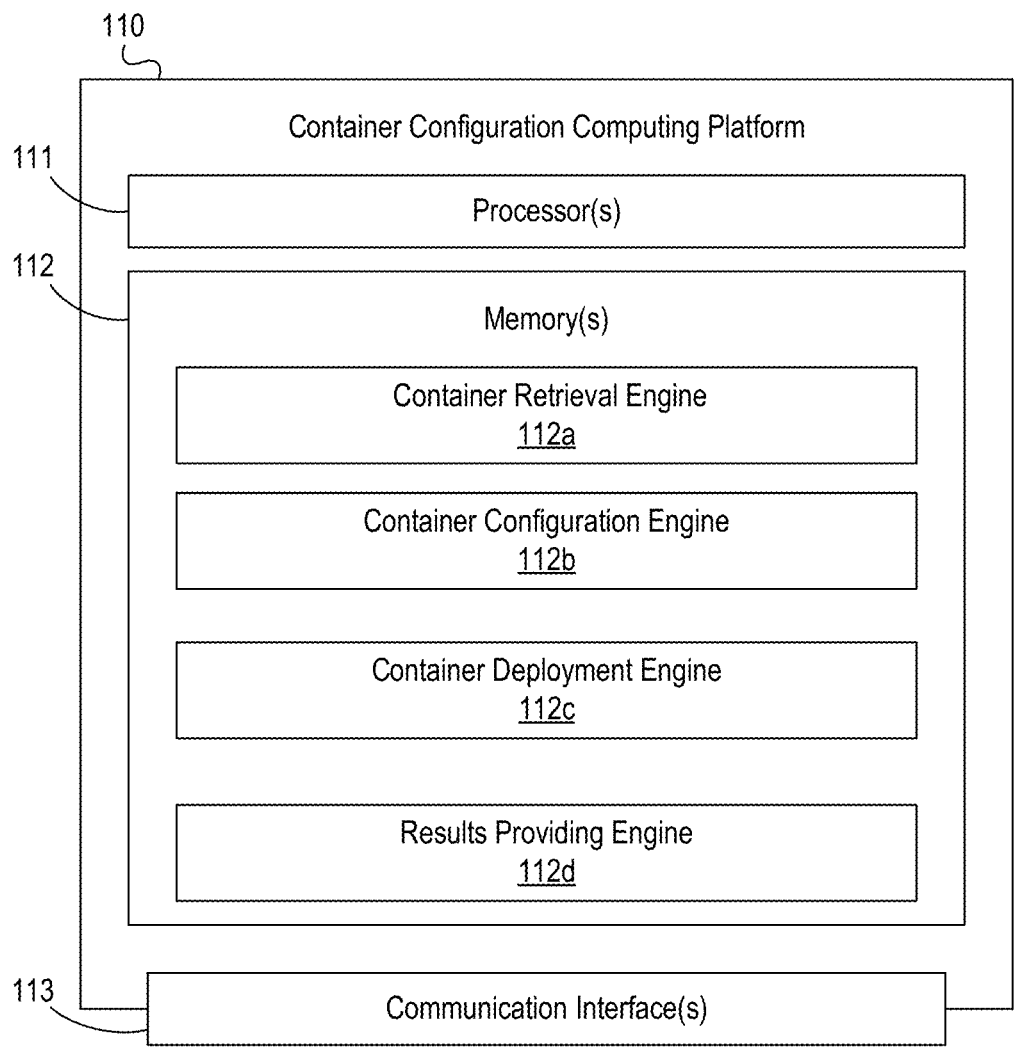

FIGS. 1A and 1B depict an illustrative computing environment for virtual containers configured to support multiple machine learning models. Referring to FIG. 1A, computing environment 100 may include one or more computer systems. For example, computing environment 100 may include a container configuration computing platform 110, enterprise computing infrastructure 120, an enterprise data storage platform 130, display device 140 (including a user interface), and client server(s) 150.

As illustrated in greater detail below, container configuration computing platform 110 may include one or more computing devices configured to perform one or more of the functions described herein. For example, container configuration computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more user interfaces, for example, associated with display device 140. For example, enterprise computing infrastructure 120 may be configured to host, execute, and/or otherwise provide one or more applications associated with an enterprise organization, such as machine learning models. In some instances, enterprise computing infrastructure 120 may be configured to provide various enterprise and/or back-office computing functions for an enterprise organization. For example, enterprise computing infrastructure 120 may manage and/or monitor various servers and/or databases that store and/or otherwise maintain information, historical data, user data, personal information, and/or other information. In addition, enterprise computing infrastructure 120 may process and/or otherwise execute commands on databases based on scripts, commands and/or other information received from other computer systems included in computing environment 100. Additionally or alternatively, enterprise computing infrastructure 120 may receive instructions from container configuration computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain, databases, database commands, and log files. Also, for example, enterprise data storage platform 130 may be configured to store and/or otherwise maintain data associated with machine learning models, such as, for example, pre-processing scripts, post-processing scripts, test data, training data, and so forth. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Display device 140 may be an enterprise computing device, such as, associated with a personal computing device (e.g., desktop computer, laptop computer) or mobile computing device (e.g., smartphone, tablet). Display device 140 may be a device on, and/or having access to, private network 160, of an enterprise organization. In addition, user interface associated with display device 140 may be linked to and/or used by a specific enterprise user (e.g., an employee of an organization operating container configuration computing platform 110). Also, for example, user interface associated with display device 140 may be configured to interact with the enterprise user, provide selectable icons, receive a query, detect a selection, and provide one or more results of machine learning models.

Client server(s) 150 may be a server that provides machine learning models. For example, client server(s) 150 may host a MLaaS platform. Client server(s) 150 may have access to public network 170. In some embodiments, client server(s) 150 may host machine learning models configured and/or hosted by enterprise computing infrastructure 120, and may have access to private network 160. In some embodiments, container configuration computing platform 110 may utilize one or more application programming interfaces (APIs) to connect to client server(s) 150.

Computing environment 100 also may include one or more networks, which may interconnect one or more of container configuration computing platform 110, enterprise computing infrastructure 120, enterprise data storage platform 130, display device 140 (including a user interface), and client server(s) 150. For example, computing environment 100 may include a private network 160 (which may, e.g., interconnect container configuration computing platform 110, enterprise computing infrastructure 120, enterprise data storage platform 130, display device 140, and/or one or more other systems which may be associated with an organization) and public network 170 (which may, e.g., interconnect client server(s) 150, with private network 160 and/or one or more other systems, public networks, subnetworks, and/or the like). In some embodiments, public network 170 may be a high generation cellular network, such as, for example, a 5G or higher cellular network. In some embodiments, private network 160 may likewise be a high generation cellular enterprise network, such as, for example, a 5G or higher cellular network. In some embodiments, computing environment 100 also may include a local network (which may, e.g., interconnect display device 140 and one or more other devices with each other).

In one or more arrangements, enterprise computing infrastructure 120, enterprise data storage platform 130, display device 140 (including a user interface), and client server(s) 150, and/or the other systems included in computing environment 100 may be any type of computing device capable of receiving input via a user interface, and communicating the received input to one or more other computing devices. For example, enterprise computing infrastructure 120, enterprise data storage platform 130, display device 140 (including a user interface), and client server(s) 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of container configuration computing platform 110, enterprise computing infrastructure 120, enterprise data storage platform 130, display device 140 (including a user interface), and client server(s) 150, may, in some instances, be special-purpose computing devices configured to perform specific functions.

Referring to FIG. 1B, container configuration computing platform 110 may include one or more processors 111, memory 112, and communication interface 113. A data bus may interconnect processor 111, memory 112, and communication interface 113. Communication interface 113 may be a network interface configured to support communication between container configuration computing platform 110 and one or more networks (e.g., network 150, network 160, a local network, or the like). Memory 112 may include one or more program modules having instructions that when executed by processor 111 cause container configuration computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of container configuration computing platform 110 and/or by different computing devices that may form and/or otherwise make up container configuration computing platform 110. For example, memory 112 may have, store, and/or include a container retrieval engine 112*a*, a container configuration engine 112*b*, a container deployment engine 112*c*, and a results providing engine 112*d*.

Container retrieval engine 112*a* may have instructions that direct and/or cause container configuration computing platform 110 to identify, over a network, a deployment identifier associated with a request to deploy one or more machine learning models, wherein the deployment identifier is indicative of the one or more machine learning models, and pre-processing scripts and post-processing scripts associated with the one or more machine learning models, as discussed in greater detail below. In some embodiments, container retrieval engine 112*a* may have instructions that direct and/or cause container configuration computing platform 110 to retrieve, over the network, a pre-configured template for a virtualization container, wherein the pre-configured template comprises one or more of a collection of servers corresponding to a development server (DEV), a user acceptance testing server (UAT), a production server (PROD), and a disaster recovery server (DR).

Container configuration engine 112*b* may have instructions that direct and/or cause container configuration computing platform 110 to retrieve, over the network and based on the deployment identifier and from a file server, the one or more machine learning models. In some embodiments, container configuration engine 112*b* may have instructions that direct and/or cause container configuration computing platform 110 to retrieve, over the network and based on the deployment identifier and from a database, the pre-processing scripts and the post-processing scripts. In some embodiments, container configuration engine 112*b* may have instructions that direct and/or cause container configuration computing platform 110 to modify the pre-configured template for the virtualization container based on the one or more retrieved machine learning models, the retrieved pre-processing scripts and the retrieved post-processing scripts.

Container deployment engine 112c may have instructions that direct and/or cause container configuration computing platform 110 to deploy, over the network, the modified virtualization container to apply the one or more machine learning models.

Results providing engine 112d may have instructions that direct and/or cause container configuration computing platform 110 to provide, over the network, results of the applied one or more machine learning models. In some embodiments, results providing engine 112d may have instructions that direct and/or cause container configuration computing platform 110 to provide, via a graphical user interface, one or more selectable icons associated with at least one of the: pre-configured template for the virtualization container, the one or more machine learning models, the pre-processing scripts, and the post-processing scripts.

Generally, each time a machine learning model is to be deployed, it is taken offline to be initialized and/or updated, and then brought back to the production environment. Changes to underlying code, datasets, models, and so forth, may not be seamless. For example, the app server that uses the model may need to be changed, just to make an update. The update itself could be an update to the app server or to the model. As used herein, machine learning models may be provided as a service (e.g., via a cloud provider), or the models may be configured in-house by data scientists based on the optimization they may need.

Vendor tools, data robots, and so forth generally utilize vendor tools, and a vendor server. However, each redeployment may generate a new model identifier, and an intermediate server may be needed to perform pre- and post-processing. However, as described herein, the underlying code may be similar across models, and may be stored in a database, and may be modifiable within a user interface, with version control and history, so that changes may be tracked. Also, for example, the code in memory may be hot-swapped without taking down the service. Also, for example, the virtualization container described herein allows changes to the pre- and post-processing scripts without a need for an intermediate server. For example, in pre-processing, the data may be enriched or transformed via the user interface, and send to the model. The predict function of the model may then communicate with the model based on user specifications. Likewise, post-process may take output of the model predictions, and transform them into a result, and send the results back to the requesting HTTP client.

The term "hot swap" as used herein, may generally refer to swapping references in memory during run-time or production, so that there is a seamless switch between applications, scripts, servers, models, databases, APIs, and so forth. In some embodiments, a core PYTHON functionality may be utilized to create a PYTHON module from a string which may be retrieved from a database. For example, references to the old code may be removed in real-time (or during run-time), and swapped with references to an updated code. Accordingly, all updates may be seamlessly applied. For example, during run-time, container configuration computing platform 110 may check if there are code changes, then hot swap, reload and continue to deploy the models. If there are changes to the model, container configuration computing platform 110 may retrieve the model, load new references onto memory, and swap out the older memory references for a seamless transition.

Figure 2:
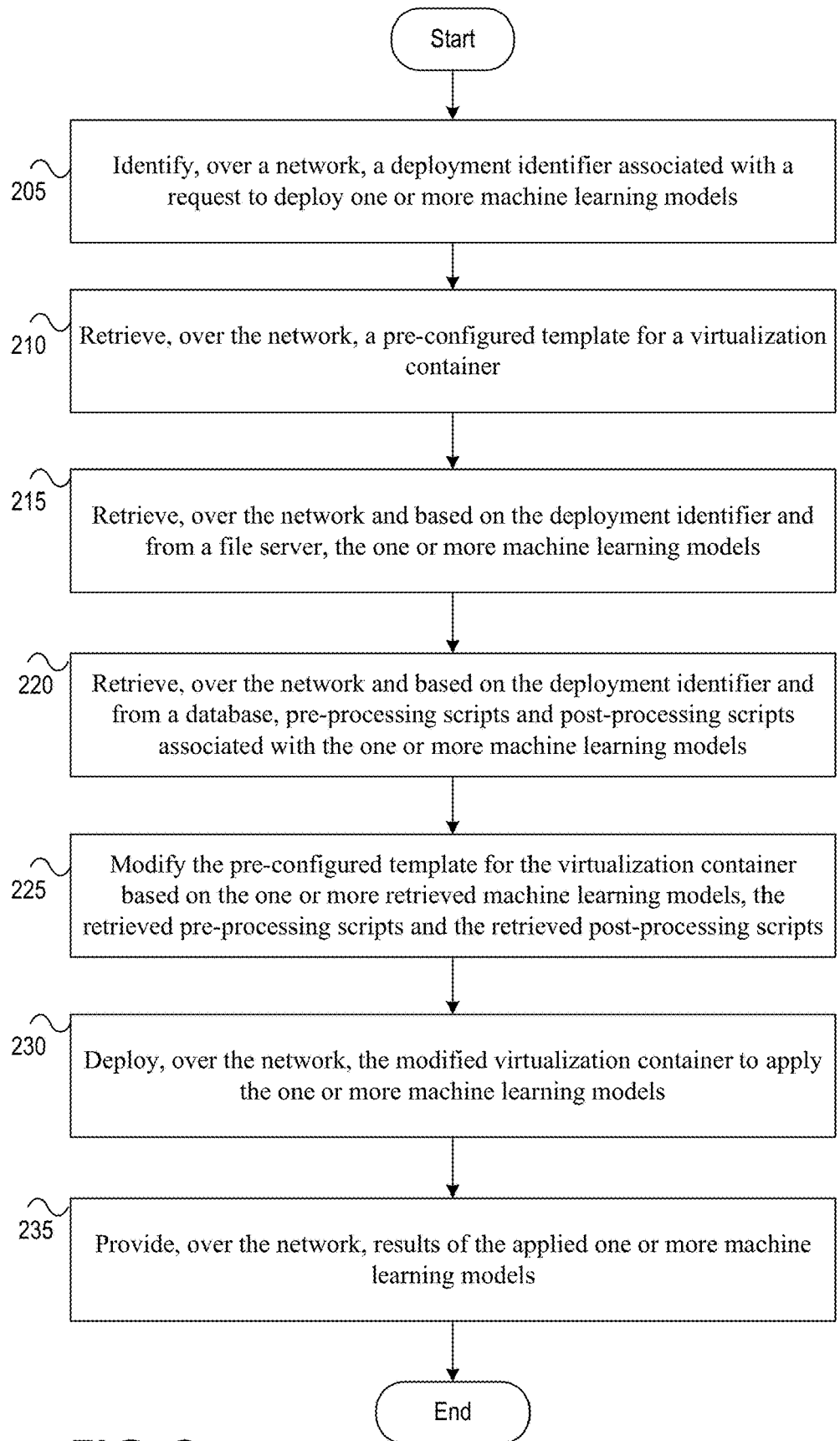
FIG. 2 depicts an illustrative method for virtual containers configured to support multiple machine learning models.

FIG. 2 depicts an illustrative method for virtual containers configured to support multiple machine learning models. Referring to FIG. 2, at step 205, container configuration computing platform 110 having at least one processor, and memory storing computer-readable instructions may identify, over a network, a deployment identifier associated with a request to deploy one or more machine learning models, wherein the deployment identifier is indicative of the one or more machine learning models, and pre-processing scripts and post-processing scripts associated with the one or more machine learning models. At step 210, container configuration computing platform 110 may retrieve, over the network, a pre-configured template for a virtualization container, wherein the pre-configured template comprises one or more of a collection of servers corresponding to a development server (DEV), a user acceptance testing server (UAT), a production server (PROD), and a disaster recovery server (DR). At step 215, container configuration computing platform 110 may retrieve, over the network and based on the deployment identifier and from a file server, the one or more machine learning models. At step 220, container configuration computing platform 110 may retrieve, over the network and based on the deployment identifier and from a database, the pre-processing scripts and the post-processing scripts. At step 225, container configuration computing platform 110 may modify the pre-configured template for the virtualization container based on the one or more retrieved machine learning models, the retrieved pre-processing scripts and the retrieved post-processing scripts. At step 230, container configuration computing platform 110 may deploy, over the network, the modified virtualization container to apply the one or more machine learning models. At step 235, container configuration computing platform 110 may provide, over the network, results of the applied one or more machine learning models.

Figure 3:
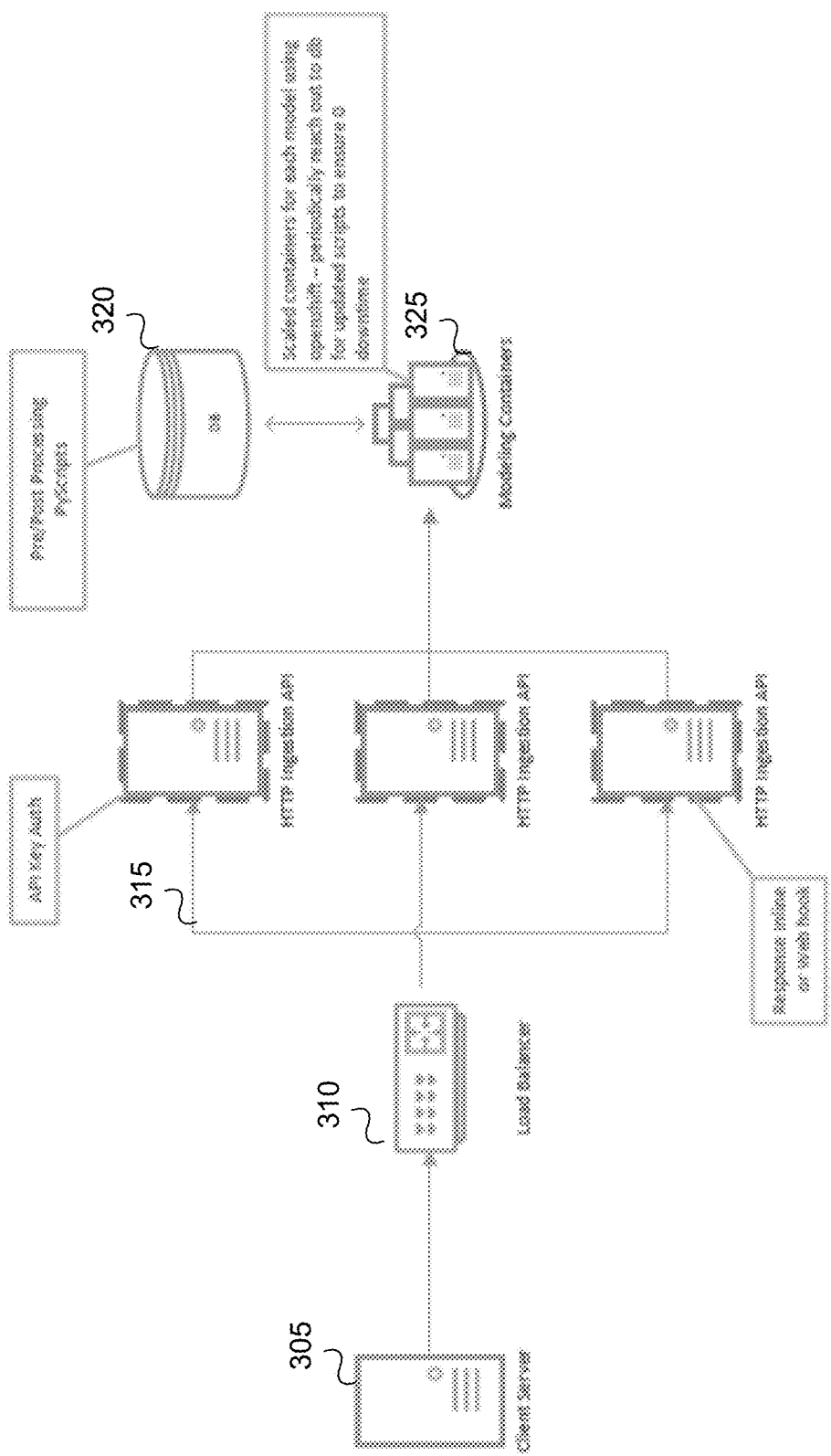
FIG. 3 depicts an illustrative HTTP-based architecture for virtual containers configured to support multiple machine learning models.

FIG. 3 depicts an illustrative HTTP-based architecture for virtual containers configured to support multiple machine learning models. Referring to FIG. 3, client server 305 may connect to load balancer 310. Load balancer 310 may then distribute the load among HTTP Ingestion APIs 315. In some embodiments, container configuration computing platform 110 may perform an API key authentication at the HTTP Ingestion APIs 315. Generally, HTTP Ingestion APIs 315 may provide inline responses, or may provide responses via a web hook.

As indicated, HTTP Ingestion APIs 315 may connect with individual virtualization containers (or modeling containers) 325. Each of the virtualization containers 325 may run a small HTTP service similar to the main HTTP service from the client server 305, but with an isolated machine learning model. In some embodiments, container configuration computing platform 110 may, based on a deployment identifier and a request, determine a type of virtualization container, machine learning models, scripts, test data sets, and so forth, that may be needed. For example, container configuration computing platform 110 may retrieve a copy of the relevant machine learning model from a file server onto virtualization containers 325. Also, for example, relevant pre- and post-processing scripts may be retrieved from a database 320 onto virtualization containers 325. Generally, each virtualization container may be pre-configured with a development server (DEV), a user acceptance testing server (UAT), a production server (PROD), and a disaster recovery server (DR). In some embodiments, each virtualization container may be pre-configured to include CPU allocation, I/O utility, network connectivity, and an application programming interface. Virtualization containers 325 allow models to be scaled automatically based on usage, and may utilize a model orchestration engine, such as, for example, OPEN-SHIFT, or KUBERNETES. The base for all virtualization containers 325 may be configured to be identical for all machine learning models.

In some embodiments, container configuration computing platform 110 may trigger virtualization containers 325 into existence, and the deployment identifier may indicate which machine learning models to retrieve and which pre-, post-processing data to retrieve, and the capacity to which virtualization containers 325 need to be scaled to. Generally, the deployment identifier is many-model-to-one type of identifier. It may be associated with the pre, post processing scripts associated with the one or more machine learning models. In some embodiments, container configuration computing platform 110 may generate the deployment identifier from a request, and generate the association with the one or more machine learning models, and the associated pre, post processing scripts. The pre- and post-processing scripts for the models may be utilized to make model predictions.

In some embodiments, container configuration computing platform 110 may initialize virtualization containers 325 based on the deployment identifier. For each request, container configuration computing platform 110 may check for potential changes to scripts and/or model, and may perform a hot swap as needed. For example, container configuration computing platform 110 may compare a script hash and/or a model hash to identify a difference, and based on a determination that there is a difference in the respective hash, container configuration computing platform 110 may trigger a memory hot swap to update to the newer version.

Figure 4:
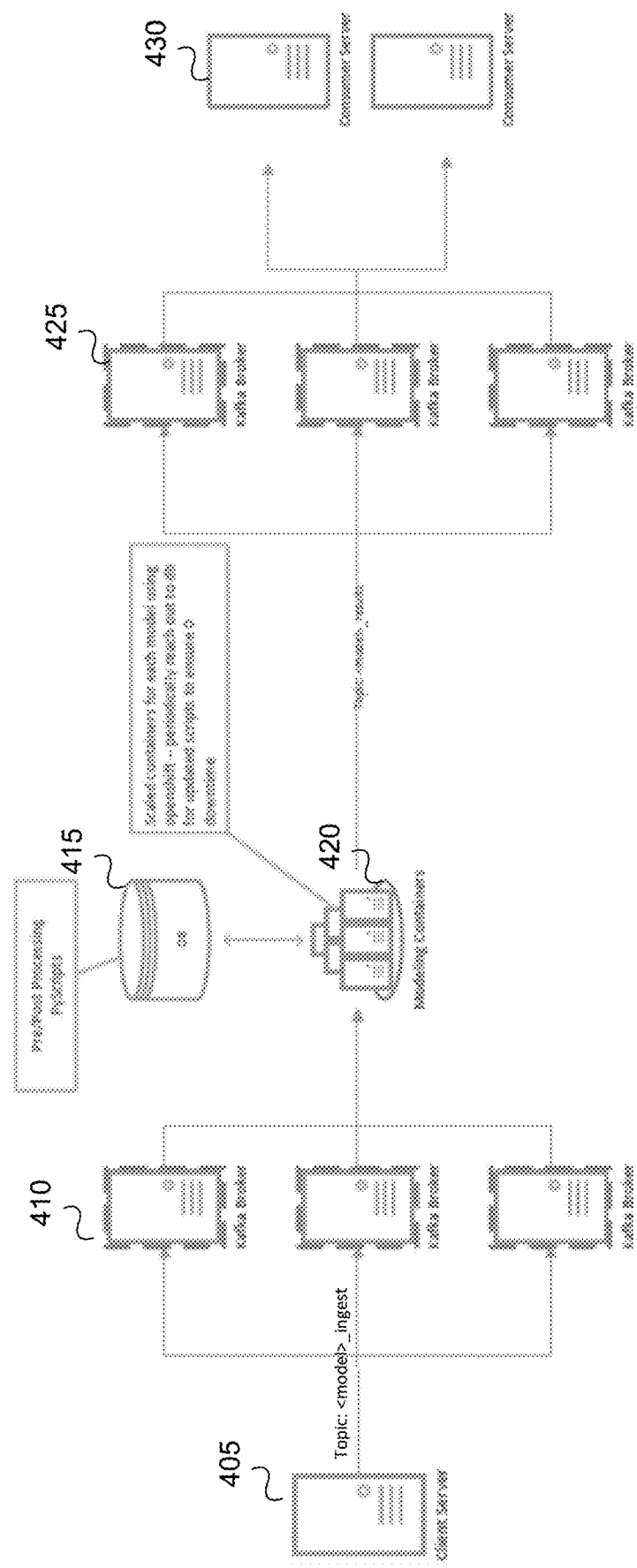
FIG. 4 depicts an illustrative streaming architecture for virtual containers configured to support multiple machine learning models.

FIG. 4 depicts an illustrative streaming architecture for virtual containers configured to support multiple machine learning models. Referring to FIG. 4, client server 405 may publish data to a queue, and modeling containers 420 (or the virtualization containers) listening in to the HTTP may be connected to an APACHE KAFKA ("KAFKA") broker 410 for their deployment identifier. Generally, a KAFKA broker may be a cluster of one or more servers that runs KAFKA. Although the KAFKA broker is described herein to facilitate understanding of the steps described herein, any other cluster of servers proving KAFKA-like services may be utilized. Generally, end users may utilize consumer server 430 to fetch messages by topic from KAFKA broker 425. For example, container configuration computing platform 110 may cause consumption of a stream of records from client server 405 via KAFKA consumer APIs associated with KAFKA broker 410. Then, container configuration computing platform 110 may prepare virtualization containers 420 utilizing OPENSHIFT, and retrieve pre- and post-processing scripts from database 415, run the machine learning models within virtualization containers 420, and publish the output of the machine learning models to KAFKA broker 425. Then, container configuration computing platform 110 may cause consumer server 430 to consume the output by topic via KAFKA consumer APIs associated with KAFKA broker 425.

As illustrated in FIG. 4, although KAFKA broker 410 and KAFKA broker 425 appear similar, there is a distinction. For example, KAFKA broker 410 pushes data to a first topic to be consumed, and processing by virtualization containers 420, the output is pushed to a second topic on KAFKA broker 425. Generally, the different topics may be utilized to avoid creating an infinite loop. For example, if first data is ingested and the output is published to the same topic, then an infinite loop may be created with the same messages being repeated. Generally, KAFKA broker 410 and KAFKA broker 425 may be the same; however, they may be configured so that the topics for KAFKA broker 410 are different from the topics for KAFKA broker 425. In some embodiments, when the output of the machine learning models is published to KAFKA broker 425 by virtualization containers 420, container configuration computing platform 110 may cause consumer server 430 to receive real-time notifications from virtualization containers 420. Accordingly, multiple consumer servers may access the APIs to consume and utilize the results simultaneously.

Figure 5:
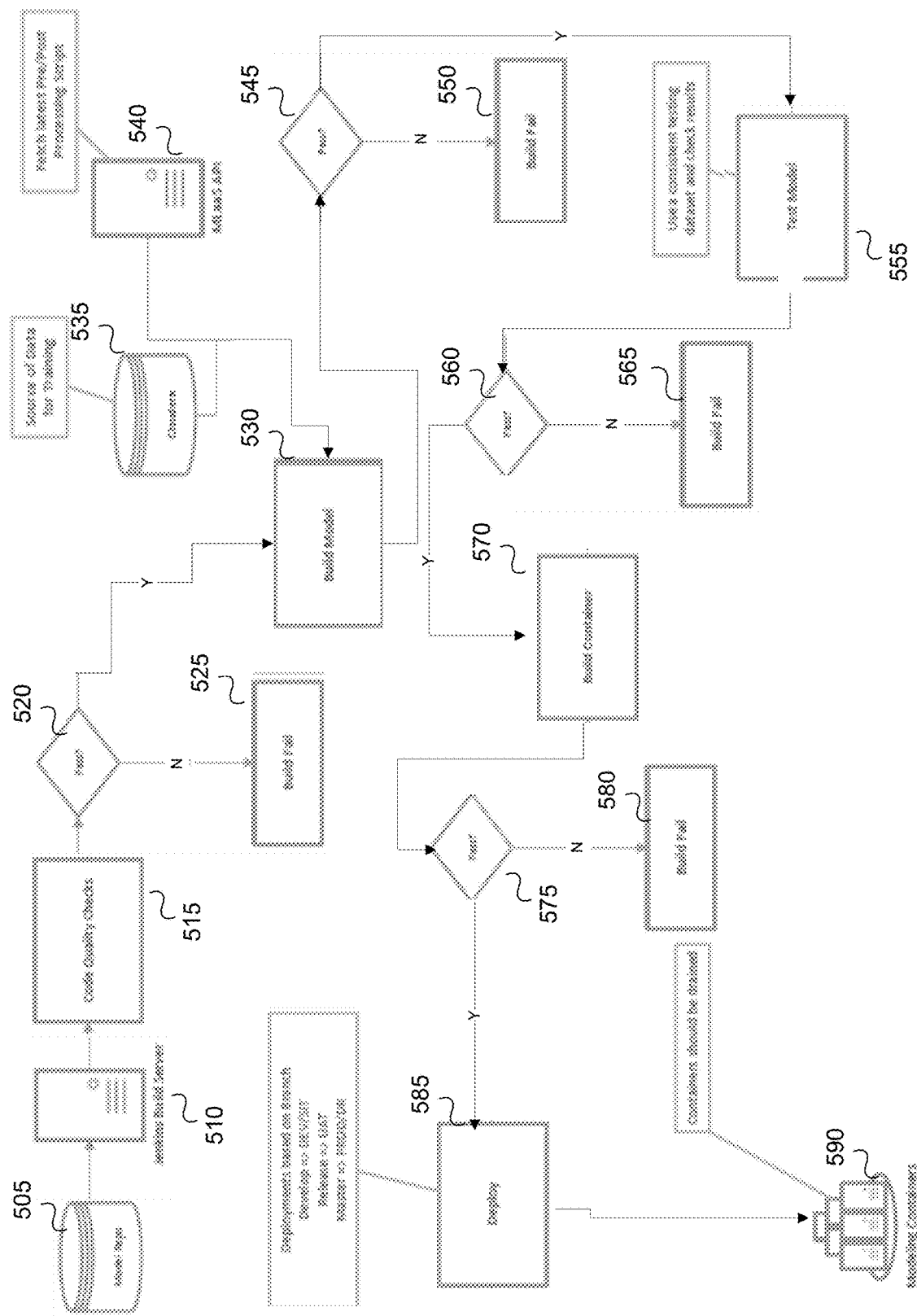
FIG. 5 depicts an illustrative flowchart for deployment of virtual containers configured to support multiple machine learning models.

FIG. 5 depicts an illustrative flowchart for deployment of virtual containers configured to support multiple machine learning models. Referring to FIG. 5, container configuration computing platform 110 may cause build server 510, such as, for example, an open source automation server such as a JENKINS server, to retrieve the machine learning models from a model repository 505. Container configuration computing platform 110 may perform code quality checks at block 515, and at block 520, container configuration computing platform 110 may determine whether the code quality check passed or failed. Upon a determination that the code quality check failed, container configuration computing platform 110 may move the process to block 525, and perform further modifications to the code. For example, a code version may be checked and/or updated.

Upon a determination that the code quality check passed, container configuration computing platform 110 may move the process to block 530 to build the model. For example, container configuration computing platform 110 may retrieve training data from a database 535. For example, a cloud-based data lake such as CLOUDERA may store the training dataset, and container configuration computing platform 110 may retrieve the training data from such a database. Also, for example, container configuration computing platform 110 may retrieve the one or more machine learning models via an API 540 to an internal server, or via an API 540 to a cloud-based service, such as, for example, a Machine-Learning-As-A-Service ("MLaaS") platform. In some embodiments, API 540 may be utilized to retrieve the training dataset and the pre= and post-processing scripts associated with the one or more machine learning models.

At block 545, container configuration computing platform 110 may determine whether the build model function passed or failed. Upon a determination that the build model function failed, container configuration computing platform 110 may move the process to block 550, and perform further modifications. For example, a model version may be checked and/or updated. Upon a determination that the build model function passed, container configuration computing platform 110 may move the process to block 555 to test the model. Generally, container configuration computing platform 110 may test the model using a test dataset for consistency.

At block 560, container configuration computing platform 110 may determine whether the test model function passed or failed. Upon a determination that the test model function failed, container configuration computing platform 110 may move the process to block 565, and perform further modifications. For example, pre- and/or post-processing scripts may be checked and/or updated. As another example, the training dataset, and/or the test dataset may need to be modified. Upon a determination that the test model function passed, container configuration computing platform 110 may move the process to block 570 to build the virtualization container.

As described herein, each request, and/or deployment identifier may be associated with multiple machine learning models. Although FIG. 5 illustrates the process for one machine learning model, the same process may be performed in parallel for multiple machine learning models, and all such processes may converge to block 570 to build the virtualization container. Generally, file servers may store a model for virtualization containers to be able to connect to and download the actual model. At block 570, container configuration computing platform 110 may connect to the respective file servers for the respective machine learning models, and download the respective machine learning models from the file servers onto the virtualization containers. As described herein, the virtualization containers may already be pre-configured with one or more of a collection of servers corresponding to a development server (DEV), a user acceptance testing server (UAT), a production server (PROD), and a disaster recovery server (DR). Accordingly, container configuration computing platform 110 may cause such servers to be activated and connected to the retrieved machine learning models. Also, for example, the virtualization containers may be pre-configured with one or more of a CPU allocation, I/O utility, network connectivity, and an application programming interface. Accordingly, container configuration computing platform 110 may determine the capacity, and scale the virtualization containers with an appropriate CPU allocation, memory usage, network bandwidth, parallel processing, network priorities, and so forth.

At block 575, container configuration computing platform 110 may determine whether the build container function passed or failed. Upon a determination that the build container function failed, container configuration computing platform 110 may move the process to block 580, and perform further modifications. Upon a determination that the build container function passed, container configuration computing platform 110 may move the process to block 585 to deploy the virtualization container.

In some embodiments, container configuration computing platform 110 may automatically deploy an updated model file to the file server, update the API, and associate a new model hash reference identifier with the updated model. In some embodiments, at block 590, container configuration computing platform 110 may drain the virtualization container. For example, containers may become outdated, and may be re-initialized. Accordingly, container configuration computing platform 110 may configure a new virtualization container, and redirect traffic from the old virtualization container to the new virtualization container.

Figure 6:
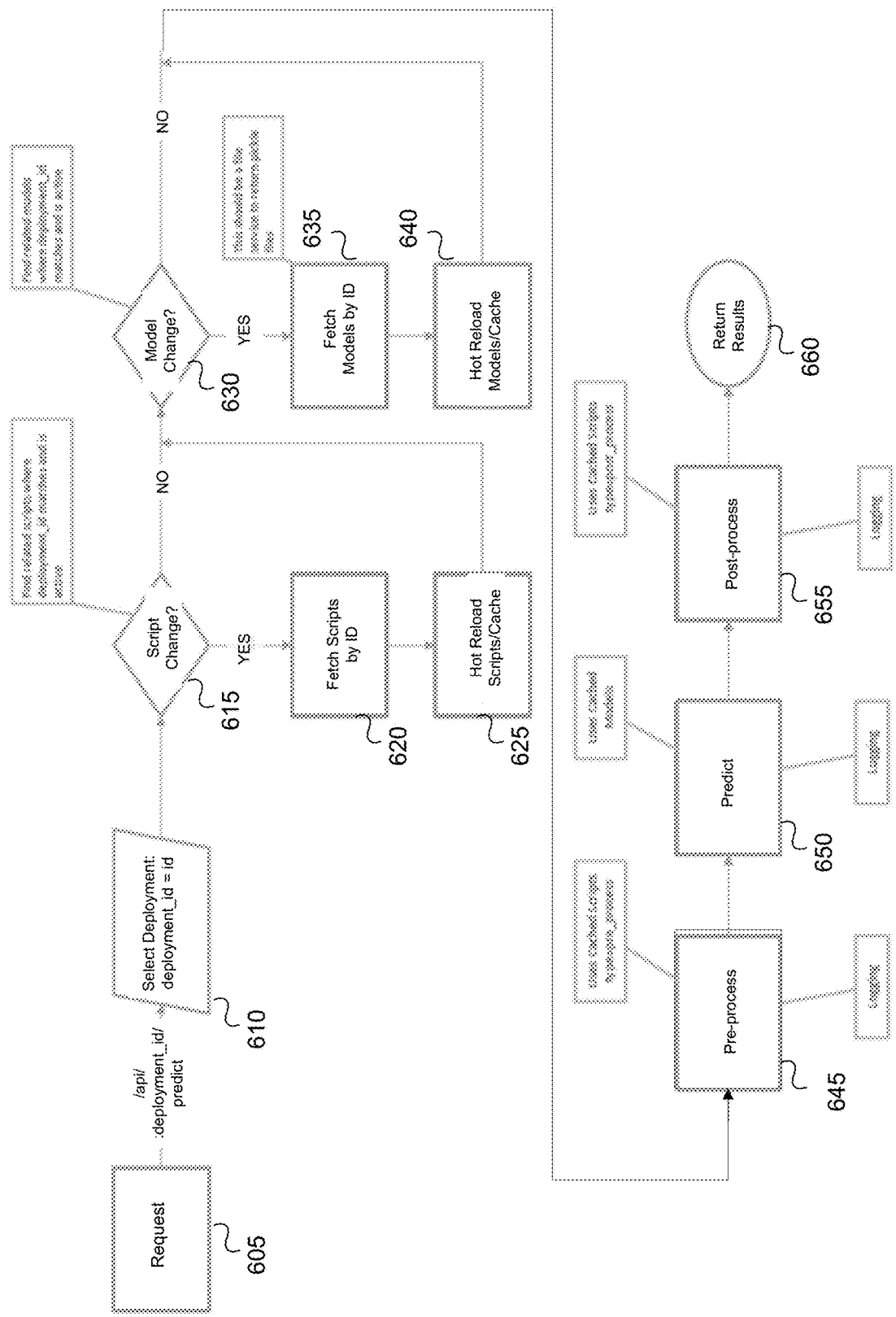
FIG. 6 depicts an illustrative flowchart for processing performed by virtual containers configured to support multiple machine learning models.

FIG. 6 depicts an illustrative flowchart for processing performed by virtual containers configured to support multiple machine learning models. Referring to FIG. 6, container configuration computing platform 110 may receive request 605. In some embodiments, request 605 may be associated with a deployment identifier. For example, container configuration computing platform 110 may receive request 605 as a HTTP request, such as, for example, "/api/:deployment_id/predict", and this may include the deployment identifier, "deployment_id." In some embodiments, container configuration computing platform 110 may generate a deployment identifier from request 605.

Based on the deployment identifier, at block 610, container configuration computing platform 110 may select a deployment by matching the deployment identifier to the correct identifier. For example, based on the deployment identifier, at block 610, container configuration computing platform 110 may identify a type of deployment, identify types of virtualization containers the request has to be routed to, and so forth.

In some embodiments, at step 615, container configuration computing platform 110 may cause a service running on a virtualization container to determine if there are any changes in pre- and post-processing scripts. For example, container configuration computing platform 110 may compare script hashes to determine if the hash has changed. For example, container configuration computing platform 110 may identify related scripts for which the deployment identifier "deployment_id" may match and is active. Upon a determination that there is a change in the scripts, container configuration computing platform 110 may, at step 620, fetch updated scripts based on a script identifier. Then, at block 625, container configuration computing platform 110 may hot swap the scripts during run-time, as described herein. Then container configuration computing platform 110 may proceed to block 630. Also, for example, container configuration computing platform 110 may proceed to block 630 from block 615 upon a determination that there is no change in the scripts.

At block 630, container configuration computing platform 110 may cause a service running on a virtualization container to determine if there are any changes to the machine learning model. For example, container configuration computing platform 110 may compare model hashes and/or version hash reference identifiers to determine if the hash has changed. For example, container configuration computing platform 110 may identify related models for which the deployment identifier "deployment_id" may match and is active. Upon a determination that there is a change to the machine learning model, container configuration computing platform 110 may, at step 635, fetch an updated model based on a model identifier, and/or a model version identifier. Then, at step 640, container configuration computing platform 110 may hot swap the model during run-time, as described herein. Then container configuration computing platform 110 may proceed to block 645. Also, for example, container configuration computing platform 110 may proceed to block 645 from block 630 upon a determination that there is no change to the machine learning model.

Generally, container configuration computing platform 110 may receive request 605, and for each request, several machine learning models may be needed to perform the tasks in the request. Accordingly, container configuration computing platform 110 may configure the container to include several machine learning models. For example, in order to predict behavior, there may be a first machine learning model that predicts hand movements, a second machine learning model that predicts face movements, and so forth. The results from these models may be aggregated by another machine learning model to predict where an individual's next movement may be, or what the individual may say. Each of these machine learning models may have model identifiers, and these machine learning models may have different versions, and these versions may be associated with respective hash reference identifiers. In some embodiments, container configuration computing platform 110 may compare the hash reference identifiers to determine whether the hash has changed, and upon a determination that a hash has changed, the model version with the latest hash latest hash reference identifier may be retrieved. For example, the deployment identifier associated with the request may be "abc123," the model identifier may be "123," and a hash reference identifier for a second version may be "dxyj2," while a hash reference identifier for a first version may be "dbty." Accordingly, container configuration computing platform 110 may compare "dxyj2" and "dbty," detect a change, and retrieve the second version of the model associated with the model identifier "123."

At block 645, container configuration computing platform 110 may perform pre-processing tasks associated with deployment of the machine learning models. For example, container configuration computing platform 110 may utilize cached scripts that were loaded in memory. In some embodiments, container configuration computing platform 110 may transform, and/or enrich the scripts. At block 650, container configuration computing platform 110 may perform the predict functions associated with the machine learning models. For example, container configuration computing platform 110 may utilize cached models that were loaded in memory. At block 655, may perform post-processing tasks associated with deployment of the machine learning models. For example, container configuration computing platform 110 may utilize cached scripts that were loaded in memory. Then, container configuration computing platform 110 may take the output of the models, transform the data, and return the results.

In some embodiments, container configuration computing platform 110 may configure and display an interactive graphical user interface. For example, container configuration computing platform 110 may provide functionality for a user to log in to access the user interface. In some embodiments, container configuration computing platform 110 may provide functionality for a user to create a deployment, name it, modify it, select pre-, and post-processing scripts, upload models that go into a file server, hash the needed database, and so forth. In some embodiments, container configuration computing platform 110 may provide functionality for a user to indicate the models corresponding to the database within the requested deployment. Also, for example, container configuration computing platform 110 may determine if a virtualization container corresponding to user-define parameters is already pre-configured. Upon a determination that a virtualization container corresponding to user-define parameters is not pre-configured, container configuration computing platform 110 may cause the virtualization container to be configured based on the user preferences. Upon a determination that a virtualization container corresponding to user-define parameters is pre-configured, container configuration computing platform 110 may retrieve the pre-configured virtualization container and modify the virtualization container with the pre- and post-processing scripts and machine learning models, and then deploy the virtualization container.

In some embodiments, container configuration computing platform 110 may pre-emptively schedule configuration of containers based on historical usage. For example, container configuration computing platform 110 may apply a machine learning model, such as, for example, an unsupervised learning technique, to detect patterns in usage based on historical activity. For example, container configuration computing platform 110 may collect usage data, including CPU and memory usage, times when such usage occurs, location data (e.g., IP addresses) for requests, types of machine learning models that are requested, and so forth. For example, such historical usage data may be collected via KUBERNETES. In some embodiments, an unsupervised learning technique, such as, for example, a K-means clustering technique, or a hierarchical clustering technique may be utilized to detect patterns of usage. In some embodiments, container configuration computing platform 110 may assign usage thresholds, compare a usage to the threshold, and allocate resources based on the comparison. For example, container configuration computing platform 110 may configure a certain number of virtualization containers based on predicted demand. Also, for example, container configuration computing platform 110 may configure the virtualization containers with appropriate pre- and post-processing scripts, machine learning models, and appropriately scaled, based on predicted demand.

In some embodiments, container configuration computing platform 110 may utilize the machine learning models to detect patterns in network traffic, and identify times when there may be a high demand. For example, container configuration computing platform 110 may determine that at approximately 9 AM, there is a demand for 10 virtualization containers, and may also determine that it may take approximately 8 minutes to configure these virtualization containers. Accordingly, container configuration computing platform 110 may initiate configuration of 10 virtualization containers at or about 8:50 AM, so that the 10 virtualization containers may be made available at 9 AM.

As described, the system herein is an improvement over utilizing a separate HTTP server for each model, managing each model deployment separately with different code bases, server infrastructure, and so forth. Systems and methods described herein normalize the processes, reduce infrastructure, reduce resources needed, reduce time, reduce risk, and utilize a simple container architecture.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive commands or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
    at least one processor; and
    memory storing computer-readable instructions that, when executed by the at least one processor, cause the computing platform to:
        identify, over a network, a deployment identifier associated with a request to deploy one or more machine learning models, wherein the deployment identifier is indicative of the one or more machine learning models, and pre-processing scripts and post-processing scripts associated with the one or more machine learning models;
        retrieve, over the network, a pre-configured template for a virtualization container, wherein the pre-configured template comprises one or more of a collection of servers corresponding to a development server (DEV), a user acceptance testing server (UAT), a production server (PROD), and a disaster recovery server (DR);
        retrieve, over the network and based on the deployment identifier and from a file server, the one or more machine learning models;
        retrieve, over the network and based on the deployment identifier and from a database, the pre-processing scripts and the post-processing scripts;
        modify the pre-configured template for the virtualization container based on the one or more retrieved machine learning models, the retrieved pre-processing scripts and the retrieved post-processing scripts;
        deploy, over the network, the modified pre-configured template for the virtualization container to apply the one or more machine learning models; and
        provide, over the network, results of the applied one or more machine learning models.

2. The computing platform of claim 1, wherein the instructions comprise additional computer-readable instructions that, when executed by the at least one processor, cause the computing platform to:
    compare, by a computing device, at least one script hash associated with one or more of the pre-processing scripts and the post-processing scripts;
    based upon a determination that the at least one script hash has changed, update the one or more of the pre-processing scripts and post-processing scripts; and
    perform, during run-time, a memory hot swap to enable a smooth update of the one or more of the pre-processing scripts and post-processing scripts.

3. The computing platform of claim 1, wherein the instructions comprise additional computer-readable instructions that, when executed by the at least one processor, cause the computing platform to:
    compare, by a computing device, at least one model hash associated with the one or more machine learning models;
    based upon a determination that the at least one model hash has changed, update the one or more machine learning models; and
    perform, during run-time, a memory hot swap to enable a smooth update of the one or more machine learning models.

4. The computing platform of claim 1, wherein the instructions comprise additional computer-readable instructions that, when executed by the at least one processor, cause the computing platform to:
    determine that the deployment identifier is not associated with a pre-configured template for a virtualization container; and
    trigger configuring of a virtualization container.

5. The computing platform of claim 1, wherein the instructions comprise additional computer-readable instructions that, when executed by the at least one processor, cause the computing platform to:
    receive the request to deploy via a HTTP interface; and
    wherein providing the results is performed via the HTTP interface.

6. The computing platform of claim 1, wherein the instructions comprise additional computer-readable instructions that, when executed by the at least one processor, cause the computing platform to:
    wherein providing the results is performed via a streaming architecture.

7. The computing platform of claim 1, wherein the instructions comprise additional computer-readable instructions that, when executed by the at least one processor, cause the computing platform to:
    retrieve test data via an application programming interface; and
    test at least one of the one or more machine learning models based on the test data.

8. The computing platform of claim 1, wherein the instructions comprise additional computer-readable instructions that, when executed by the at least one processor, cause the computing platform to:
    after receiving the request, determine a type of pre-configured template for the virtualization container to be retrieved.

9. The computing platform of claim 1, wherein the instructions comprise additional computer-readable instructions that, when executed by the at least one processor, cause the computing platform to:

provide, via a graphical user interface, one or more selectable icons associated with at least one of the: pre-configured template for the virtualization container, the one or more machine learning models, the pre-processing scripts, and the post-processing scripts.

10. The computing platform of claim 1, wherein the instructions comprise additional computer-readable instructions that, when executed by the at least one processor, cause the computing platform to:

determine, based on a machine learning model, historical usage of the virtualization container;

predict, based on the machine learning model, a demand for the virtualization container; and automatically configure, based on the predicted demand, one or more virtualization containers prior to receiving requests.

11. The computing platform of claim 10, wherein the historical usage comprises at least on one of: central processing unit (CPU) usage and memory usage, and wherein the instructions comprise additional computer-readable instructions that, when executed by the at least one processor, cause the computing platform to:

compare the historical usage to a usage threshold; and
predict the demand based on the comparing.

12. The computing platform of claim 10, wherein the historical usage comprises a temporal pattern of activity.

13. The computing platform of claim 1, wherein the instructions comprise additional computer-readable instructions that, when executed by the at least one processor, cause the computing platform to:

scale the virtualization container based on the request.

14. A method, comprising:
at a computing platform comprising at least one processor, and memory:
pre-configuring a template for a virtualization container, wherein the pre-configuring comprises one or more of a central processing unit (CPU) allocation, input/output (I/O) utility, network connectivity, and an application programming interface, and configuring a collection of servers corresponding to a development server (DEV), a user acceptance testing server (UAT), a production server (PROD), and a disaster recovery server (DR);
identifying, over a network, a request and a deployment identifier associated with the request;
retrieving, over the network and based on the deployment identifier and from a file server, one or more machine learning models;
retrieving, over the network and based on the deployment identifier and from a database, pre-processing scripts and post-processing scripts associated with the one or more machine learning models;
modifying the template for the virtualization container based on the one or more retrieved machine learning models, the retrieved pre-processing scripts and the retrieved post-processing scripts;
deploying, over the network, the modified template for the virtualization container to apply the one or more machine learning models; and
providing, over the network, results of the applied one or more machine learning models.

15. The method of claim 14, further comprising:
comparing, by a computing device, at least one script hash associated with one or more of the pre-processing scripts and the post-processing scripts;
based upon a determination that the at least one script hash has changed, updating the one or more of the pre-processing scripts and post-processing scripts; and performing a memory hot swap to enable a smooth update of the one or more of the pre-processing scripts and post-processing scripts.

16. The method of claim 14, further comprising:
comparing, by a computing device, at least one model hash associated with the one or more machine learning models;
based upon a determination that the at least one model hash has changed, updating the one or more machine learning models; and
performing a memory hot swap to enable a smooth update of the one or more machine learning models.

17. The method of claim 14, further comprising:
providing, via a graphical user interface, one or more selectable icons associated with at least one of the: pre-configured template for the virtualization container, the one or more machine learning models, the pre-processing scripts, and the post-processing scripts.

18. The method of claim 14, further comprising:
determining, based on a machine learning model, historical usage of the virtualization container;
predicting, based on the machine learning model, a demand for the virtualization container; and
automatically configuring, based on the predicted demand, one or more virtualization containers prior to receiving requests.

19. The method of claim 18, wherein the historical usage comprises at least on one of: CPU usage and memory usage, and wherein the method further comprising:
comparing the historical usage to a usage threshold; and
predicting the demand based on the comparing.

20. One or more non-transitory computer-readable media storing instructions that, when executed by a computing platform comprising at least one processor, and memory, cause the computing platform to:

provide, via a graphical user interface, one or more selectable icons associated with at least one of: a pre-configured template for a virtualization container, one or more machine learning models, pre-processing scripts and post-processing scripts;

detect, via the graphical user interface, a selection of the one or more selectable icons;

receive, via the graphical user interface and based on the selection, a deployment identifier associated with a request to deploy one or more machine learning models, wherein the deployment identifier is indicative of the one or more machine learning models, and pre-processing scripts and post-processing scripts associated with the one or more machine learning models;

retrieve, over a network, a pre-configured template for a selected virtualization container;

retrieve, over the network and based on the deployment identifier and from a file server, the one or more selected machine learning models;

retrieve, over the network and based on the deployment identifier and from a database, the selected pre-processing scripts and the selected post-processing scripts;

modify the pre-configured template for the selected virtualization container based on the one or more retrieved machine learning models, the retrieved pre-processing scripts and the retrieved post-processing scripts;

deploy, over the network, the modified pre-configured template for the selected virtualization container to apply the one or more machine learning models; and provide, via the graphical user interface, results of the applied one or more machine learning models.

* * * * *